United States Patent [19]

Garrod

[11] 4,354,597
[45] Oct. 19, 1982

[54] COVERS FOR CASSETTE BOXES

[76] Inventor: Norman J. Garrod, Great Common, Bletchingley, Surrey, England

[21] Appl. No.: 127,429

[22] Filed: Mar. 5, 1980

Related U.S. Application Data

[62] Division of Ser. No. 968,214, Dec. 11, 1978, abandoned.

[51] Int. Cl.³ .......................................... B65D 85/672
[52] U.S. Cl. .................................. 206/387; 206/482; 206/487; 206/493; 150/52 R
[58] Field of Search ............... 206/482, 487, 493, 472, 206/387, 459; 150/52 R

[56] References Cited

U.S. PATENT DOCUMENTS

| | | | |
|---|---|---|---|
| 1,445,593 | 2/1923 | Iscowitz | 206/472 |
| 1,908,999 | 5/1933 | Myers | 206/493 |
| 2,577,304 | 12/1951 | Brooks | 219/44 R |
| 2,996,173 | 8/1961 | Will | 206/459 |
| 3,587,848 | 6/1971 | Frochig | 206/482 |
| 3,730,338 | 5/1973 | Chesky | 206/459 |
| 3,769,741 | 11/1973 | Hessier | 206/472 |
| 4,141,446 | 2/1979 | Cuffe | 206/387 |

*Primary Examiner*—Joseph Man-Fu Moy
*Attorney, Agent, or Firm*—Scrivener, Clarke, Scrivener and Johnson

[57] ABSTRACT

A cover for a box comprising a base and a pivotal lid, e.g. a box for a tape cassette, comprises a base panel for overlying the base of the box, a cover panel for overlying the cover of the box and connected to the base panel by a spine panel for overlying a side wall of the box. The cover is made from sheet material, e.g. cardboard, and each of the cover and base panels comprises two thicknesses of sheet material with the inner layers of the cover panel connected only along an edge to the other layer. The spine panel may also be made of two thicknesses of sheet material, the inner layer being connected to the inner layer of the cover panel and free to move relative to the outer layer of the spine panel in flexing the cover. Alternatively the inner layer of the cover panel may be shaped to be inserted into the box to underly the lid of the box.

7 Claims, 3 Drawing Figures

COVERS FOR CASSETTE BOXES

This is a division of application Ser. No. 968,214, filed Dec. 11, 1978, now abandoned.

The present invention relates to improvements in covers for boxes of the type described in patent application Ser. No. 25983/76.

According to one aspect of the present invention there is provided a cover for a box comprising a base and a lid mounted for pivotal movement relative to the base, the cover comprising a base panel for overlying the base of the box, a cover panel for overlying the lid of the box and connected to the base panel by a spine panel of sufficient width to accommodate the box between the cover panel and the base panel, wherein the cover panel and the spine panel are each made of two layers of sheet material, the outer layer of the spine panel being integrally connected to the base panel and the outer layer of the cover panel, the inner layer of the spine panel being integrally connected only to the inner layer of the cover panel and being free to move relative to the outer layer of the spine panel during relative movement of the base and cover panels.

According to another aspect of the present invention there is provided a cover for a box comprising a base and a lid mounted for pivotal movement relative to the base, the cover comprising a base panel for overlying the base of the box, a cover panel for overlying the lid of the box and connected to the base panel by a spine panel of sufficient width to accommodate the box between the cover panel and the base panel, wherein the base panel, the cover panel and the spine panel are each made of two layers of sheet material, the outer layer of the spine panel being integrally connected to the outer layer of the base panel and the outer layer of the cover panel, the inner layer of the spine panel being integrally connected to one of the base and cover panels only and being free to move relative to the outer layer of the spine panel and the other one of the base and cover panels during relative movement of the base and cover panels.

Advantageously the inner layer of the spine panel is connected to a flap which is inserted between the layers of the other one of the base and cover panels and is free to move relative thereto during relative movement of the base and cover panels.

According to yet another aspect of the present invention there is provided a cover for a box comprising a base and a lid mounted for pivotal movement relative to the base about an axis along one side of the box, the cover comprising a base panel for overlying the base of the box, a cover panel for overlying the lid of the box and connected to the base panel by a spine panel of sufficient width to accommodate the box between the cover panel and the base panel and for overlying that side of the box at which the lid is pivotted, wherein the cover panel is made of two layers of sheet material and the inner layer is dimensioned to be inserted inside the box to overlie the inner surface of the lid of the box.

The invention also relates to the combination of a cover and a box as described above.

The present invention will be more fully understood from the following description of embodiments thereof given by way of example only, with reference to the accompanying drawings, in which.

Figure 1:
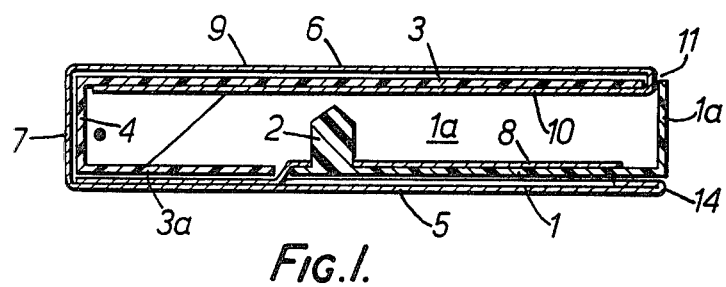
FIG. 1 is a section through a box provided with an embodiment of a cover according to the present invention.

The covers shown in the drawings are intended for use with a box which comprises a base and a lid hinged to the base along one side of the box.

As shown in FIG. 1, the box is a conventional cassette box comprising a base 1, carrying 3 side walls 1a and two upstanding studs 2 for engagement in the spindle apertures of a cassette, and a lid 3 carrying the fourth side wall 4 and hinged to the base about an axis parallel to the wall 4. The lid defines with a member 3a a U-shaped slot in which the cassette is received, the member 3a extending in the plane of the base 1 when the box is closed, the base 1 being cut back to accommodate the member 3a.

Figure 2:
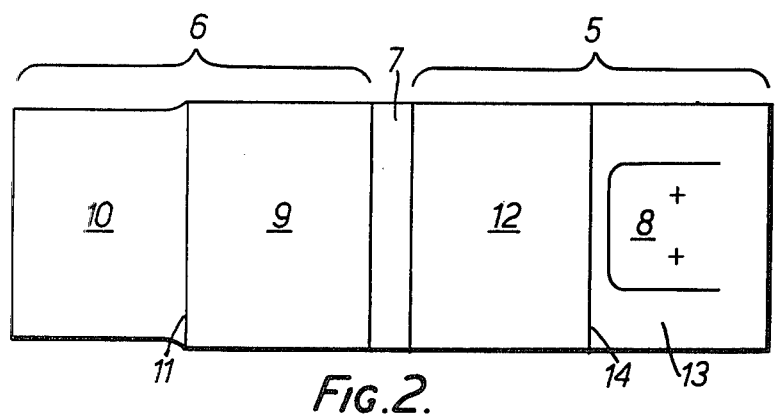
FIG. 2 is a plan view of a blank from which the cover of FIG. 1 is made.

The cover shown in FIGS. 1 and 2 of the drawings comprises a base panel 5 for overlying the base 1 of the box and a cover panel 6 for overlying the lid 3 of the box. The panels 5 and 6 are interconnected by a spine panel 7 for overlying that side wall 4 of the box at which the base and lid of the box are hinged together.

The base panel 5 of the cover is fixed to the base 1 of the box. As shown this is effected using a flap 8 as described in application Ser. No. 25983/76. Other means may alternatively be provided for releasably fixing the base panel of the cover to the base of the box or the box may be permanently fixed to the cover by adhering the base to the base panel of the cover.

The cover panel 6 is engaged but not fixed to the box. This engagement is obtained by making the cover panel of two layers of which the outer layer 9 overlies the outer surface of the lid 3 and the inner layer 10, integrally connected to the outer layer 9 along the free edge 11 of the panel 6 remote from the spine panel, is folded about edge 11 and introduced into the box to overlie the inner surface of the lid 3 of the box.

With this arrangement, both the cover panel and the base panel of the cover are engaged with the box but in such a way that the box can be opened and the contents removed and so that, as the box is opened, the cover panel will move relative to the lid of the box so as to accommodate movement of the spine panel relative to the box and prevent the spine panel being bent or otherwise damaged.

The base panel 5 of the cover may also comprise two layers 12, 13 of material, as described in application Ser. No. 25983/76, the two layers being connected together along the free edge 14 of the base panel remote from the spine panel, and may be adhered directly together.

It will be appreciated that the box may take other forms and may be designed for containing other articles. For example, the box may be similar to that shown in FIG. 1 but designed for housing a reel, e.g. a film or video tape, the box being generally square instead of rectangular with a single central stud instead of a pair of studs for engaging in the single aperture of the reel. With such a box, the blank of FIG. 2 is modified to correspond to the dimensions of the box and the flap 8 is provided with a single opening for engaging the single stud in the box. The box may, of course, have any suitable dimensions required for a product and, if attached to the cover by a flap similar to flap 8, must have a slit in the plane of the base through which the flap can be introduced and one or more studs for engagement with the flap. Where the box is permanently or otherwise releasably fixed to the base panel of the cover, neither of these features is of course necessary.

Figure 3:
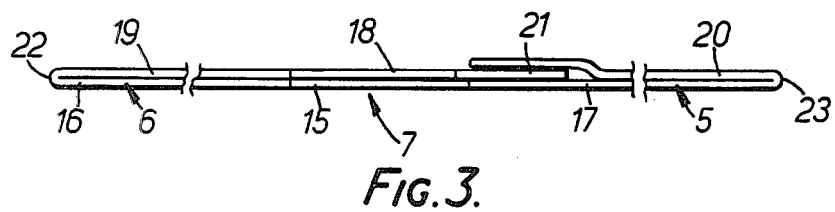
FIG. 3 is a section through another embodiment of a cover when opened out into a flat condition.

In another embodiment of a cover for one or more boxes, shown in FIG. 3 of the drawing the cover has the construction generally shown in FIGS. 4 to 6 of application Ser. No. 25983/76 to which reference is hereby made. The base panel 5 and cover panel 6 of the cover are both made of two layers of sheet material and the spine panel 7 is also made of two layers of sheet material. The outer layer 15 of the spine panel is integrally connected to the outer layers 16, 17 of the cover and base panels respectively and the inner layer 18 of the spine panel is integrally connected only to the inner layer 19, 20 of one of the cover and base panels respectively. As shown the inner layer of the spine panel is integrally connected to the inner layer 19 of the cover panel. In addition a flap 21 extends from the edge of the inner layer of the spine panel 18 remote from the layer 19 and is arranged, as shown, between the inner and outer layers 20, 17 of the base panel. The two layers of the cover and base panels are integrally connected together a their free edges 22, 23 and may also be adhered together but do not need to be adhered together. The two layers of the spine panel are not adhered together and the flap 21 is not adhered to either of the inner or outer layers of the base panel so that the inner layer 18 of the spine panel is free of direct connection to the outer layer of the spine panel and the base panel. With this arrangement, when the cover is opened out flat as shown in FIG. 3, the inner layer 18 of the spine panel can and will move relative to the outer layer to allow the spine panel to be flattened without distortion. Equally the flap 21 will move relative to the two layers of the base panel but will stay between the layers and thus cause the inner layer of the spine panel 18 to flatten with the rest of the cover.

In a modification, the inner layer of the base panel may be omitted. The flap 16 may also be omitted.

As in the preceding embodiment, the cover shown in FIG. 3 may be fixed to the base of a box as described in application Ser. No. 25983/76, if the box is suitably constructed, or in some other removable or permanent manner. It will also be appreciated that the panel 6 may serve as the base panel and the panel 5 as the cover panel and boxes may be mounted on one or both of the panels 5 and 6.

What is claimed is:

1. The combination of a box comprising a base and a lid mounted for pivotal movement relative to said base about an axis along one side of said box and a cover for said box comprising: a base panel for overlying the base of the box, said base of said box being attached to said base panel of said cover; a cover panel for overlying the lid of the box, said cover panel being made of two layers of sheet material the inner one of said layers of said cover panel being inserted first into said box to overlie the inner surface of said lid thereof without attachment thereto; and a spine panel connecting said base panel to said cover panel and of sufficient width to accommodate the box between said cover panel and said base panel and overlying that side of the box at which the lid is pivotted, said base panel being made of two layers of sheet material which are integrally connected together along that edge remote from said spine panel and are adhered together.

2. A cover as claimed in claim 1, wherein said base panel is made of two layers of sheet material which are integrally connected along that edge remote from said spine panel.

3. A cover for a box comprising a base and a lid mounted for pivotal movement relative to said base about an axis along one side of said box, said box including a slot therein substantially in the plane of the base and a stud projecting inwardly of the box from the base, said cover comprising:

a base panel for overlying the base of the box;
a cover panel for overlying the lid of the box; and
a spine panel connecting said base panel to said cover panel and of sufficient width to accommodate the box between said cover panel and said base panel and overlying that side of the box at which the lid is pivotted, said cover panel being made of two layers of sheet material, the inner one of said layers being dimensioned to be inserted inside the box to overlie the inner surface of the lid of the box, said base panel including a flap for insertion in the box through said slot for engagement with the stud to engage the box with the cover.

4. A cover as claimed in claim 3 wherein said base panel is made of inner and outer layers of sheet material which are integrally connected along that edge remote from said spine panel, said flap being carried by said inner layer.

5. A cover as claimed in claim 4 wherein said flap is an integral part of said inner layer and said two layers of said base panel are adhered together except in the region of said flap.

6. The combination of a box comprising a base and a lid mounted for pivotal movement relative to said base about an axis along one side of said box, said box having a slot therein substantially in the plane of the base and a stud projecting inwardly of the box from the base; and a cover for said box comprising: a base panel for overlying the base of the box, said base of said box being attached to said base panel of said cover; a cover panel for overlying the lid of the box, said cover panel being made of two layers of sheet material the inner one of said layers of said cover panel being inserted first into said box to overlie the inner surface of said lid thereof without attachment thereto; and a spine panel connecting said base panel to said cover panel and of sufficient width to accommodate the box between said cover panel and said base panel and overlying that side of the box at which the lid is pivotted, said base panel including a flap for insertion in the box through the slot and for engagement with the stud to engage the box with the cover.

7. The combination as claimed in claim 6, wherein said box is adapted to receive a tape cassette.

* * * * *